United States Patent [19]

Chapman et al.

[11] 3,924,813

[45] Dec. 9, 1975

[54] METHOD AND APPARATUS FOR CLAY BENEFICIATING

[75] Inventors: John H. Chapman, Sandersville; Randolph O. Smith, Gordon; Verlon E. Josey, Sandersville, all of Ga.

[73] Assignee: Yara Engineering Corporation, Elizabeth, N.J.

[22] Filed: Nov. 11, 1974

[21] Appl. No.: 522,523

[52] U.S. Cl. .................. 241/4; 241/30; 241/46.11
[51] Int. Cl.² ........................................ B02C 17/16
[58] Field of Search .......... 241/4, 20, 21, 30, 46.11, 241/46.15, 46.17, 184

[56] References Cited

UNITED STATES PATENTS

| | | | |
|---|---|---|---|
| 1,956,293 | 4/1934 | Klein et al. | 241/21 |
| 2,361,059 | 10/1944 | Robertson | 241/21 |
| 3,298,618 | 1/1967 | Talpey | 241/46.17 |
| 3,817,457 | 6/1974 | Clark | 241/20 |

Primary Examiner—Granville Y. Custer, Jr.
Attorney, Agent, or Firm—Buell, Blenko & Ziesenheim

[57] ABSTRACT

A method and apparatus are provided for clay beneficiation by wet grinding process using a fine size, hard, relatively dense grinding media such as glass spheres.

7 Claims, 1 Drawing Figure

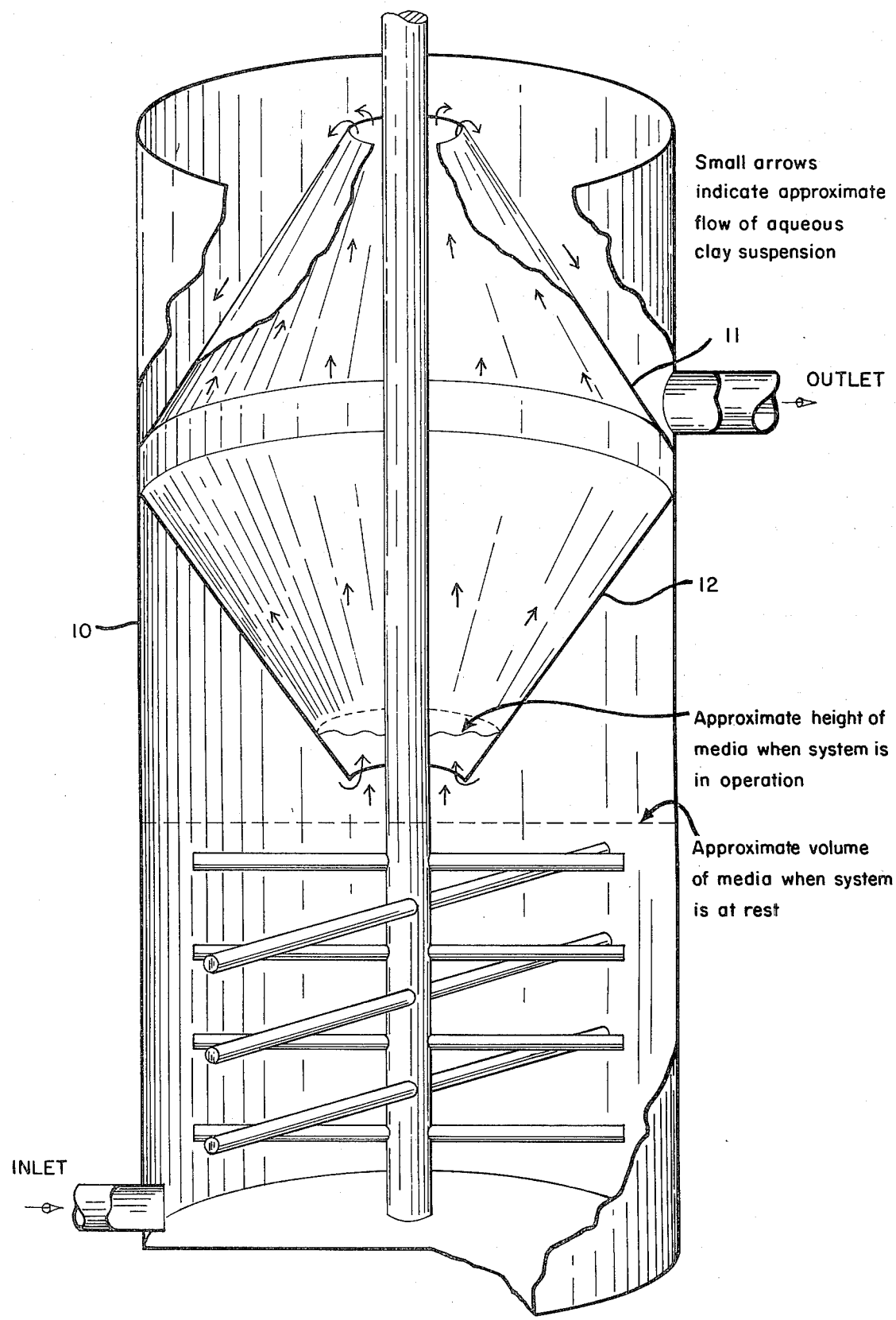

METHOD AND APPARATUS FOR CLAY BENEFICIATING

This invention relates to a method and apparatus for clay beneficiating with a wet grinding process using a fine size, hard, relatively dense grinding media, and more particularly to an improved process and apparatus for the production of clay products having improved properties particularly beneficial to and suited to the paper coating industry.

It is well known in both the clay processing industry and in the paper coating industry that many factors are involved in the determination of the usefulness of a particular clay product to the paper coating industry.

Two of the more important factors involved in this determination are the brightness of the dry clay pigment as measured using magnesium oxide as a standard and the rheological properties of an aqueous suspension of the clay product.

For many years, the conventional process for beneficiation of the parent clay ore to produce a product suitable for use in the paper coating industry has been to deflocculate the parent ore in an aqueous suspension and separate the fine and coarse particles by a sedimentation or centrifugation process. After separation, the fine fraction ($<2\mu$) is further beneficiated by various processes to enhance its usefulness to the paper coating industry.

There have been, in recent years, many techniques developed for the beneficiation and improvement of clay products. There have been techniques developed for improved products through beneficiation of the parent clay ore and/or fractions of the parent clay ore. Most of these techniques have been developed for the beneficiation of clay products useful to the paper coating industry and some of these developed techniques have utilized a method of wet grinding with a hard, relatively dense grinding media. Typical of these prior art techniques are those disclosed in Hockberg et al. U.S. Pat. No. 2,855,156 and Hockberg U.S. Pat. No. 2,581,414. None of the presently known techniques show the potential of using a fine size, hard, relatively dense grinding media in the wet grinding process. The term, fine size media, is meant to include those sizes of grinding media less than 40 (<40) mesh as measured by the Tyler screen method.

One of the major problems of using the fine size grinding media is the effective design of the grinding chamber whereby the fine media can be retained in the grinding chamber on a continuous basis.

It is the purpose of this invention to demonstrate a method of beneficiation of the parent clay ore and/or portions therefrom to produce an improved clay product by using a technique involving the wet grinding process utilizing the previously mentioned fine size, hard, relatively dense grinding media as the grinding media.

SUMMARY

In summary, the present invention provides an efficient process with a production of improved clay products, particularly suited for the paper coating industry, using a wet grinding process with a fine size, hard, relatively dense media as the grinding media.

In prior known techniques, it has been shown that improved recoverable product, and in some cases, improved brightness properties can be achieved by methods using a wet grinding process involving hard, dense media as the grinding media. None of these techniques involve the use of a fine size, hard, relatively dense media and none of these techniques show any improvement in the rheological properties of an aqueous suspension of the clay product. By contrast, most of the prior known techniques using a hard, dense grinding media show a substantial degradation of the brightness and rheological properties of the clay product from such methods.

In the broadest aspect on this invention, a method is provided for the selective improvement of the clay product by improving the product recovery from the parent clay ore and/or fractions thereof without substantial degradation of the brightness and/or rheological properties. In most cases improvement of the brightness and/or rheological properties of the resulting beneficiated clay product from the parent ore and/or fraction thereof is realized by the practice of this invention. More specifically, it is the purpose of this invention to demonstrate that an improved clay product can be produced by a wet grinding process utilizing a fine size, hard, relatively dense media as the grinding media.

The mechanical working of the grinding media and aqueous clay suspension may be accomplished in several different ways, and this has been demonstrated in prior known techniques for the coarser, hard dense medias, but not for the fine size media as is demonstrated in this invention. The preferred system for the purpose of this invention is a mechanical apparatus set up as illustrated in the accompanying drawing which is a vertical section through a grinding chamber for use in practicing this invention.

The deflocculated parent clay ore and/or fraction thereof is fed to the grinding chamber 10 containing the fine size media, resulting in a mixture of aqueous suspension and grinding media in a ratio ranging from 1:1.5 to 1.5:1 on a volume basis of grinding media to aqueous suspension depending on the system that is desirable for the particular application. It is also preferred by this technique that the aqueous clay suspension be from 10% to 50% clay solids for the best working conditions when the technique is used on the parent clay ore or coarse fraction ($>2\mu$) from the parent clay ore. The clay solids content of the aqueous clay suspension of a fine ($<2\mu$) fraction can be as high as 60% solids for equally good results, depending on the desired application. The prime mechanical working conditions are enhanced by using a grinding chamber that includes a cone-inverted cone shaped baffle 11–12 to hinder the upward flow of the grinding medium beyond the grinding portion of the chamber, thereby eliminating the use of a screening device to retain the medium in the grinding chamber. A screening device can most certainly be utilized, but the inventors found such a method to be extremely difficult to incorporate into the working of the technique and keep in a satisfactory operating condition at a constant rate.

One of the principal factors of the grinder chamber design is the selection of height of the cone-shaped baffles 11–12 which is sufficient to allow the dropping out of the harder, denser grinding media to stop the overflow of this media into the clay product once it has been ground.

The inventors have found that various media to clay ratios, various clay solids in the clay water suspension, various grinding speeds, and various grinding rates (or retention time in the case of a batch operation) have a decisive influence on one or more of the quantitative or qualitative properties of the beneficiated product when the general conditions of the present technique is followed.

We have found that there are certain critical operating conditions for the present technique. We have found no indications that any of the presently known commercial beneficiation processes are adversely affected by this present technique. We have determined that some of the presently employed techniques are improved by this invention.

We have determined the following parameters for the operating conditions of this process.

1. If the grinding media to clay ratio is allowed to drop lower than a 1:1.5 ratio, the efficiency of the process is greatly reduced and a speed necessary to insure proper working of the clay system is detrimental because of the overflow of the media into the clay product.
2. If the media to clay ratio is increased above a 1.5:1 volume basis, the system does not allow a sufficient flow of media and clay water suspension to insure proper working of the clay by the grinding action of the media.
3. A media size of >40 mesh is detrimental to the high shear viscosity properties of the clay products and in most cases is detrimental to the brightness properties of the clay product.
4. A media size of <325 mesh is detrimental to the system because the media becomes intermixed with the clay system and, because some of the clay particles are of the same size of the media, they are extremely difficult to differentiate and separate. The retention of the hard media in a clay product would be detrimental to the usefulness of the clay product.
5. If the clay suspension is less than 10% clay, the efficiency of the system is lowered and the volume of material becomes so great as to carry over the media into the product because of the fluid nature of the system with this dilution effect.
6. If the clay suspension is greater than 60% clay, the system is not fluid enough to allow the movement of the media within the clay-water system to insure the proper working of the clay to achieve the desirable properties.
7. If the grinder speed is less than 200 rpm, the movement of the media and clay suspension is not sufficient to insure the working of the clay by the action of the media to achieve the desirable properties.
8. If the grinder speed is greater than 800 rpm, the movement of the mediaclay system is so great as to minimize the proper working of the clay by the media and also produces a movement of such upward flow that the media is carried over into the product, which is undesirable.
9. A flow rate through the grinder sufficient to keep the system operating with a sufficient flow of new unworked clay material so that work on the clay is uniform and yet not so rapid that the clay is not uniformly worked or a carry over of the media takes place. In this connection we have found that a flow rate of 100 cc per minute to 400 cc per minute is critical when using a grinding chamber of sufficient size to contain 5500 cc of media and 5500 cc of an aqueous clay suspension when the grinder is operating on a continuous basis and the grinding speed is 600 rpm. A flow rate of <100 cc/minute does not allow enough clay suspension to enter the grinding system to keep the system operating with a sufficient flow of new unworked clay material, and the results become inconsistent because of some portions of the clay system receiving more work than other portions. A flow rate of >400 cc/minute produces a force of flow that is detrimental to the system due to the rapid movement of the clay suspension through the system. This does not allow sufficient working of the clay system for the desired results. This rapid flow also produces a carry-over of the media into the clay product which is undesirable. The particular flow rate will, of course, change if the size of the apparatus is changed and must be adjusted for the particular operating system. Generally a retention time of 4–10 minutes is desirable.
10. The height of the grinder chamber must be sufficient to retain the media. This height will depend on the speed of the grinder rotor; the fluidity of the system which is dictated by the media to clay ratio, and clay solids; and the flow rate of the clay water suspension.

We have found the preferred dense media for use in our system to be glass spheres of the size set out above. An excellent source of such spheres is Quackenbush Corporation.

When a batch system is utilized, we find that the retention time is dependent upon the other operating conditions and can be established to fit each separate required condition. For our optimum operating conditions we found that a 6 minute grinding retention time at a speed of 600 rpm and a media to aqueous clay suspension rate of 1.5:1 on a volume basis gave the optimum product properties.

We believe that this invention can, perhaps, be best understood by reference to the following examples.

EXAMPLE I

This test was run on a Washington County, Georgia, clay. The sample was blunged in a mine blunging process and degritted in the laboratory to remove particles of sand, etc. greater than 325 mesh. The degritted aqueous suspension (35% clay) was ground with various size media at two different retention times in a batch operation as previously described in the optimum conditions. All batch operations for the purpose of this disclosure were run on a Union Attritor, model 1S, manufactured by Union Process, Inc., Akron, Ohio. After grinding, the samples were sized by centrifugation to yield a fine fraction of approximately 82% <$2\mu$ which is commonly referred to in the industry as a number 2 coating clay. For the purpose of this disclosure, the percent yield is based on the amount of product received from the degritted parent material. Samples were acidified after fractionation to a 3.0 pH using a 10% solution of a 50/50 blend of sulphuric acid and aluminum sulfate. Samples were leached with the indicated amount of $Na_2S_2O_4$ (sodium dithionite) and the pH adjusted to 3.0. Leaching time was 30 minutes at ambient temperature. Samples were filtered to remove the major portion of the water and dried by conventional means.

Brightness determinations were made according to TAPPI Tentative Standard T-646, M-54.

Brookfield viscosities were measured on a 71% solids deflocculated aqueous clay suspension using a Brookfield model RVF 100 viscometer with a No. 3 spindel.

Measurements were taken at 10 rpm. The Hercules viscosities were measured using a recording, automatic Tecton Hercules viscometer.

TEST DATA

|  | Product Recovery | Un-Leached | Brightness 3 lbs. | 6 lbs. | Viscosity Brook. | Hercules |
|---|---|---|---|---|---|---|
| No Grinding | 55.4% | 83.9 | 85.8 | 87.0 | 160cpe | 1050rpm |
| Ground 6 min. with 14–20 mesh | 80.5% | 84.2 | 86.7 | 87.1 | 210cpe | 660rpm |
| Ground 12 min. with 14–20 mesh | 83.8% | 84.0 | 86.6 | 86.9 | 200cpe | 530rpm |
| Ground 6 min. with 60–100 mesh | 78.3% | 84.3 | 86.9 | 87.3 | 160cpe | 9.1 dy. |
| Ground 12 min. with 60–100 mesh | 82.0% | 84.2 | 86.8 | 87.1 | 150cpe | 5.4 dy. |
| Ground 6 min. with 100–170 mesh | 76.0% | 84.1 | 86.9 | 86.9 | 160cpe | 5.5 dy. |
| Ground 12 min. with 100–170 mesh | 80.1% | 84.3 | 86.9 | 86.9 | 150cpe | 5.2 dy. |

EXAMPLE II

A Washington County, Georgia crude clay ore was used for this example. The processing technique was the same as in Example I with the exception of the product fraction size. In this example, the products were obtained by centrifugation to achieve products of approximately 92% <2$\mu$ equivalent spherical diameter (E.S.D.). Also, for the purpose of this example, a continuous unit as previously described involving a 1:1 ratio of media to aqueous clay suspension (35% clay) was employed. The grinding rate for this example was 200 cc per minute.

TEST DATA

|  | Product Recovery | Un-Leached | Brightness 3 lbs. | 6 lbs. | Viscosity Brook. | Hercules |
|---|---|---|---|---|---|---|
| Unground | 57.8% | 84.1 | 86.9 | 87.5 | 200cpe | 4.5 dy. |
| Ground with 40–50 mesh | 72.5% | 84.4 | 87.5 | 88.0 | 240cpe | 970rpm |
| Ground with 60–100 mesh | 67.5% | 84.8 | 87.9 | 88.4 | 290 cpe | 7.6 dy. |

EXAMPLE III

Effect of grinder retention time and speed using the fine size media.

For the purpose of this example, a mechanical set-up as previously described for continuous operation was employed. A Washington County, Georgia mine deflocculated, degritted crude clay ore was used as the feed source. Three grinding speeds and three flow rates were used for the purpose of this example.

The products from the various runs were of the fraction size as previously described and designated as approximately 82% <2$\mu$ (E.S.D.) or commonly known in the clay industry as number 2 coating clay.

The data is presented on the same basis as previously described.

The grinding media size for the purpose of this example was less than 60 mesh and greater than 100 mesh (<60, >100).

TEST DATA

| Sample | Prod. Recov. | Un-Leached | Brightness 3 lbs. Na$_2$S$_2$O$_4$ | 6 lbs. Na$_2$S$_2$O$_4$ | Viscosity Brook. | Hercules |
|---|---|---|---|---|---|---|
| Control No grinding | 67.5% | 84.3 | 86.7 | 86.9 | 180cpe 250cpe | 1020rpm 17.0 dy. |
| 300 cc/min. at 400rpm | 82.4% | 84.4 | 86.7 | 87.2 | 150cpe 175cpe | 8.3 dy. 6.4 dy. |
| 200 cc/min. at 400rpm | 82.5% | 84.4 | 86.4 | 86.8 | 150cpe 175cpe | 10.3 dy. 8.7 dy. |
| 100 cc/min. at 400rpm | 84.9% | 84.4 | 86.4 | 86.8 | 150cpe 175cpe | 7.1 dy. 6.7 dy. |
| 300 cc/min. at 600rpm | 85.0% | 84.6 | 86.1 | 87.2 | 160cpe 190cpe | 14.8 dy. 10.8 dy. |
| 200 cc/min. at 600rpm | 87.4% | 85.3 | 86.4 | 86.4 | 175cpe 210cpe | 8.4 dy. 7.4 dy. |
| 100 cc/min. | | | | | | |

TEST DATA-continued

| Sample | Prod. Recov. | Un- Leached | Brightness 3 lbs. Na₂S₂O₄ | 6 lbs. Na₂S₂O₄ | Viscosity Brook. | Hercules |
|---|---|---|---|---|---|---|
| at 600rpm | 86.9% | 84.9 | 86.2 | 86.9 | 160cpe 210cpe | 9.9 dy. 8.4 dy. |
| 300 cc/min. at 800rpm | 87.0% | 85.0 | 86.4 | 86.7 | 200cpe 240cpe | 875rpm 980rpm |
| 200 cc/min. at 800rpm | 87.4% | 85.0 | 86.4 | 86.5 | 190cpe 250cpe | 925rpm 970rpm |
| 100 cc/min. at 800rpm | 90.8% | 85.2 | 87.0 | 87.0 | 260cpe 290cpe | 575rpm 640rpm |

EXAMPLE IV

|  |  | Product No. 1 | | | | Product No. 2 | | | |
|---|---|---|---|---|---|---|---|---|---|
|  |  | Prod. Rec. | Bright. | Brook. | Hercules | Prod. Rec. | Bright. | Brook. | Hercules |
| Control | (no grinding) | 59 | 85.2 | 110 | 1040 rpm | 42 | 85.6 | 110 | 1050 rpm |
| Control | (Clay No. 1 ground) | 75 | 85.4 | 100 | 15 dy. | 60 | 85.9 | 110 | 14 dy. |
| 90% Clay No. 1 10% Clay No. 2 | No grinding | 66 | 85.3 | 140 | 9.6 dy. | 54 | 85.7 | 160 | 9.4 dy. |
| 90% Clay No. 1 10% Clay No. 2 | Ground | 81 | 85.5 | 100 | 5.7 dy. | 63 | 86.8 | 150 | 5.0 dy. |
| 75% Clay No. 1 25% Clay No. 2 | No grinding | 75.5 | 86.0 | 140 | 5.1 dy. | 60 | 86.8 | 170 | 3.7 dy. |
| 75% Clay No. 1 25% Clay No. 2 | Ground | 85 | 86.3 | 115 | 3.7 dy. | 66 | 87.0 | 175 | 3.5 dy. |

For the purposes of this example, we used a mine blunged pipeline fraction of a Washington County, Georgia crude. These samples were ground on a continuous grinding unit as previously described using three different size grinding media, at a rate of 300 ml/minute. The grinder speed for the purpose of this example was 400 rpm.

The product from these ground samples were beneficiated to achieve a product of 82% <2μ as described in Example I.

TEST DATA

| Sample | Product Recovery | Leached Brightness | Brookfield | Hercules |
|---|---|---|---|---|
| Control | 35% | 85.1 | 350cpe | 570rpm |
| 14-25 mesh | 67% | 85.0 | 390cpe | 500rpm |
| 20-30 mesh | 67% | 85.0 | 410cpe | 530rpm |
| 60-100 mesh | 69% | 85.6 | 350cpe | 780rpm |

EXAMPLE V

It has become a thoroughly general practice for the clay manufacturers to blend the clays from various areas to achieve the good qualities that are inherent in some of these clay areas. It is the purpose of this example to illustrate the usefulness of the fine ceramedia grinding technique of this invention to this type of blended clay.

For the purpose of this example, we selected two crude clay ores from the Twiggs County, Georgia area of varying degrees of quality. These clays were prepared under normal conditions with the exception of the grinding technique that has been previously described. Two separate products were made from these various blends to illustrate the possibilities that exist utilizing the grinding technique that is mentioned in this application.

There are several unique features involved in this processing techinique which have not heretofore been available to clay processors. These features are:

The rheological properties of the clay product are in most cases substantially improved by utilizing this grinding technique with the fine grinding media. In comparison with the coarser media, this is a desirable feature because the coarser media in most cases gives a detrimental effect to the rheological properties of the clay product.

There is a substantial improvement in the percent of recoverable product by the grinding technique of this invention. The use of the fine media as here described makes it possible to achieve this increase in recoverable product while also obtaining the improved rheological and brightness properties.

We have shown an improvement in the brightness property of the clay product in most cases. In comparison with the coarser, hard, dense media, which in most cases shows a detrimental effect on the brightness, the fine media process of this invention is unique in its ability to achieve this brightness improvement.

In the foregoing specification, we have set out certain presently preferred practices and embodiments, however, it will be understood that this invention may be otherwise embodied within the scope of the following claims.

We claim:

1. A method of clay beneficiating comprising the steps of:
   a. forming a aqueous slurry of clay to be beneficiated having a clay concentration of about 10% to 60% in the slurry;

b. passing said clay slurry through a media grinder operating at a speed in the range of 200 rpm to 800 rmp and having therein a finely divided, relatively dense grinding media having a particle size in the range 325 mesh to 40 mesh;

c. maintaining a relative ratio of clay in said slurry to grinding media in said media grinder in the range 1.5:1 to 1:1.5;

d. maintaining a level of slurry in said grinder sufficiently high so that the grinding media is retained in the grinder; and e. recovering the ground clay from the grinder.

2. A method as claimed in claim 1 wherein the grinding media is glass spheres.

3. A method as claimed in claim 1 wherein the grinding volume in the grinder is about 1100 cc and the flow rate through the grinder is in the range 100 cc to 400 cc per minute.

4. A method as claimed in claim 3 wherein the grinding speed is 600 rpm.

5. A method as claimed in claim 1 wherein the retention time of the clay in the grinder is 6 minutes at a speed of 600 rpm.

6. A method as claimed in claim 1 wherein the retention time in the grinder is in the range 4 to 10 minutes.

7. An apparatus for media grinding clay comprising a cylindrical grinding chamber having a vertical axis, inlet means adjacent the bottom of said chamber, a pair of conical baffles having their bases adjacent each other and fixed to the walls of said chamber and their apices open in opposite directions, an outlet means above the bases of said baffles whereby flow through said grinder passes vertically upward through the apices of the cones, and an impeller means in the bottom of said cylinder below the lowermost baffle apex.

* * * * *